US006260805B1

(12) United States Patent
Yocum, Jr. et al.

(10) Patent No.: US 6,260,805 B1
(45) Date of Patent: Jul. 17, 2001

(54) METHOD OF CONTROLLING ATTITUDE OF A MOMENTUM BIASED SPACECRAFT DURING LONG-DURATION THRUSTER FIRINGS

(75) Inventors: John F. Yocum, Jr., Rancho Palos Verdes; Patrick A. Cazeau, Ladera Heights; Stephen J. Koffman, Redondo Beach; Douglas A. Baker, Torrance, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/222,450

(22) Filed: Dec. 29, 1998

(51) Int. Cl.[7] .................................................. B64G 1/24
(52) U.S. Cl. .......................... 244/164; 244/165; 244/169
(58) Field of Search .................................. 244/164, 165, 244/169, 171; 74/13

(56) References Cited

U.S. PATENT DOCUMENTS 4,521,855 * 6/1985 Lehner et al. ....................... 244/164
5,205,518 * 4/1993 Stetsonm, Jr. ....................... 244/165
5,310,143 * 5/1994 Yocum et al. ....................... 244/164
5,311,435 * 5/1994 Yocum et al. ....................... 244/164
5,452,869 * 9/1995 Basuthakur et al. ................. 244/165
5,506,780 * 4/1996 Montenbruck et al. .............. 244/164
5,610,820 * 3/1997 Shankar et al. ..................... 244/164
5,765,780 * 6/1998 Barskey et al. ..................... 244/165

* cited by examiner

Primary Examiner—Galen L. Barefoot
(74) Attorney, Agent, or Firm—Terje Gudmestad (57) ABSTRACT

A method is provided for controlling the attitude of a momentum biased spacecraft about all three mutually orthogonal axes during a thruster firing maneuver without separately sensing angular displacement, angular rate, or angular acceleration about the spacecraft yaw axis. The method includes a transient phase during which a yaw feedforward torque is computed based on the known pitch/yaw coupling due to thruster geometry, and a steady state phase, during which feedback gains are adjusted to estimate yaw attitude based on coupling of a steady state disturbance torque about the roll axis of the spacecraft and a steady state disturbance torque about the yaw axis of the spacecraft.

27 Claims, 4 Drawing Sheets

METHOD OF CONTROLLING ATTITUDE OF A MOMENTUM BIASED SPACECRAFT DURING LONG-DURATION THRUSTER FIRINGS

This application contains subject matter related to that disclosed in U.S. patent application Ser. No. 08/577,444 filed on Dec. 22, 1995.

FIELD OF THE INVENTION

The invention is generally related to spacecraft attitude control systems, and in particular is related to systems for controlling spacecraft rotation about a spacecraft yaw axis.

BACKGROUND OF THE INVENTION

Spacecraft have been developed that use low-thrust thrusters mounted to the spacecraft, such as, for example electric thrusters, that may be used for station keeping maneuvers. Such low-thrust thrusters can create significant disturbance torques when used for long duration burns, such as burns requiring thrust over a duration of three hours to seven hours.

In a typical communications satellite mission in which the satellite is required to maintain its attitude in a single orientation with respect to the earth, and is not required to perform frequent attitude reorientation maneuvers, a momentum biased spacecraft is the most economical configuration for attitude control. A significant advantage of a momentum biased spacecraft is that it requires minimal attitude control system hardware: a two-axis earth sensor, a pitch momentum wheel, and associated electronics. Specifically, it does not require an attitude sensor to measure attitude about the satellite-to-Earth nadir line, an axis herein called "yaw." To improve transient behavior, some designs add an ability to steer the spacecraft pitch momentum vector (e.g., using a V-wheel, or a single or double gimbaled momentum wheel), although this is not absolutely essential for adequate performance.

The use of ion propulsion systems for satellites has been considered for a number of years. See, e.g., Krulle, G., Zeyfang, E., "Combined Orbit and Attitude Control of Geostationary Satellites Using Electric Propulsion," *IFAC Automatic Control in Space, Noordwijkhout,* The Netherlands, 1982 and Marsh, Elbert L., "Attitude Control of Solar Electric Spacecraft by Thruster Gimbaling," Paper AIAA 73-1116, $10^{th}$ *Electric Propulsion Conference,* Lake Tahoe, Nev., Oct. 31–Nov. 2, 1973. These early papers directed to the use of ion propulsion are survey papers postulating what might be feasible with ion propulsion. Early on in the implementation of the use of ion propulsion, it was recognized that gimbaled thrusters would be required in order to point the thrust vector of an ion propulsion engine through the spacecraft center of mass, or to intentionally offset the thrust vector to create desired torques for attitude control.

As ion propulsion designs moved closer to realization, attitude control system designers were forced to design control systems that were capable of sensing and correcting relatively large disturbances created by ion engines. It was generally concluded that, in addition to ion thrust vector steering, a yaw sensor would be required for the purpose of measuring yaw response to the disturbance torque created by an ion propulsion system. An article authored by T. G. Duhamel entitled "Implementation of Electric Propulsion for North-South Stationkeeping on Eurostar Spacecraft," paper AIAA 89-2274, *AIAA/ASEM/SAE/ASEE $25^{th}$ Joint Propulsion Conference,* 1989, described a typical concept for attitude control on a momentum biased spacecraft using ion propulsion. The attitude control system design described in the Duhamel AIAA article was developed for the Eurostar spacecraft, and indicates that a yaw sensor must be added to measure yaw motion created by the ion engines. In the Eurostar design, a star sensor was added, even though the attitude control system already had a yaw gyro. The yaw gyro was not used to measure yaw motion created by the ion thrusters, because the yaw gyro was not capable of the numerous on/off cycles nor the long life operation necessary to support ion propulsion.

The following references describe several other attitude control system designs that have been modified to adapt a momentum biased spacecraft to use ion propulsion:

Nakashima, A., Fujiwara, Y., Okada, K., Yamada, K., Miyazaki, H., Matsue, T., "The Attitude Control Subsystem and Inter Orbit Pointing Subsystem for Communications and Broadcasting Engineering Test Satellite", 13 IFAC Symposium Automatic Control in Aerospace—Aerospace Control '94, Sep. 12–16, 1994;

Potti, J., Mora, E. J., Pasetti, A., "An Autonomous Stationkeeping System for Future Geostationary Telecommunication Satellites (An ARTEMIS based ASK System)," *International Astronautical Federation,* 1993;

Duhamel, T. G., Benoit, A., "New AOCS Concepts for ARTEMIS and DRS," *Proc. Pirst International Conference on Spacecraft Guidance, Navigation and Control Systems,* ESTEV, Noordwijk, The Netherlands, Jun. 4–7, 1991;

Mazzini, L., Ritorto, A., Astin, E., Attitude Control Design Concepts in the DTRM Satellites," i Pro., First International Conference on Spacecraft Guidance, Navigation and Control Systems, ESTEV, Noordwijk, The Netherlands, Jun. 4–7, 1991;

Duhamel, T. G., "Implementation of Electric propulsion for north-south Stationkeeping on the EUROSTAR Spacecraft," Paper AIAA 89-2274, *AIAA/ASME/SAE/ASEE $25^{th}$ Joint propulsion Conference,* 1989; and U.S. Pat. No. 5,349,532, "Spacecraft Attitude Control and Momentum Unloading Using Gimbaled and Throttled Thrusters," issued to Tilley, Scott W., Liu, Tung Y., Highman, John S., Sep. 20, 1994.

In each of the six references listed above, the modifications to the attitude control systems have included the addition of a yaw sensor to measure yaw attitude during the period when ion propulsion is activated. The yaw sensor may take the form of a sun sensor, a long life gyro, or a star sensor. In addition, the modifications to the attitude control system typically include some means for steering the ion propulsion thrust vector, such as a two-axis gimbaled mechanism, a translational mechanism, or a throttling mechanism.

The foregoing references provide a sampling of the state of the art in attitude control for spacecraft using ion engines in order to account for the relatively large disturbances created by firing such ion engines. The design for the ARTEMIS satellite also employed a star sensor used solely for attitude sensing during ion propulsion operation, as set forth in the above-noted Potti et al., Duhamel et al., and Mazzini et al. references. The ARTEMIS spacecraft was eventually launched circa 1994, but the ion propulsion payload failed almost immediately. In a totally independent design, Tilley et al., U.S. Pat. No. 5,349,532 discloses a control system that also incorporates a yaw sensor in the preferred embodiment. The control system disclosed in the Tilley et al. '532 patent employs both a sun sensor and a yaw gyro, either of which may be selected by a ground commandable switch. This suggests that Tilley et al. also believed that a yaw sensor was mandatory and that the life of a yaw gyro was insufficient to permit its use as the only option for sensing yaw rate.

A paper entitled "On Orbit Robust Control Experiment of Flexible Spacecraft ETS-VI", authored by Kida et al. and published in the *AIAA Journal of Guidance, Control and Dynamics*, Volume 20 No. 5 September–October 1997, described an attitude control systems used on ETS-VI, a Japanese satellite which flew an experimental ion propulsion payload. The basic attitude control system designed for ETS-VI is a zero-momentum, 4-reaction wheel configuration which also incorporates a yaw attitude sensor.

A paper authored by Nakashima et al. entitled "The Attitude Control Subsystem and Inter Orbit Pointing Subsystem for Communications and Broadcasting Engineering Test Satellite," published in 13 *IFAC Symposium Automatic Control in Aerospace-Aerospace Control* '94, September, 1994, describes engineering test satellite COMETS, that includes ion propulsion. The attitude control system on the COMETS satellite is a momentum biased design using a V-wheel concept to achieve three-axis torquing capability. The COMETS spacecraft also includes strapdown gyros to perform three-axis attitude determination, presumably to facilitate attitude control during ion engine firing.

Barsky et al. U.S. Pat. No. 5,765,780 entitled "Systematic Vectored Thrust Calibration for Satellite Momentum Control," is the only work known to the inventors of the present invention that attempts ion engine control for a momentum biased satellite without the addition of a separate yaw sensor. The Barsky et al. '780 patent employs an elaborate ground processing system to model and estimate the time-varying location of the spacecraft center of mass so that the parameters defining gimbal angles of the ion engine positioning system can be uplinked to the spacecraft on subsequent maneuvers. The Barsky et al. '780 patent discloses the use of ion thrusters mounted on gimbals. However, the gimbals are preset prior to each maneuver and not moved during the maneuver. The approach described in the Barsky et al. '780 patent was never flown on a spacecraft, because of the development schedule for the ion engines themselves. However, had this control system been used on a spacecraft, it would likely have experienced significant yaw pointing errors that were not foreseen. Such unforeseen errors arise, in part, from spacecraft center of mass motion created by movement of bi-propellant liquids within tanks mounted to the spacecraft. In the performance predictions used for the system disclosed in the Barsky et al. '780 patent, it was assumed that surface tension forces would be sufficient to restrain the motion of the bi-propellant liquids, when subjected to the micro-g forces induced by firing the ion engine. However, subsequent flight experience has shown this to be an invalid assumption. Accordingly, the design approach used in accordance with the present invention includes on-board, real-time, closed loop control and is much more robust to unmodeled disturbances than was the design in the Barsky et al. '780 patent.

Chan et al. U.S. Pat. No. 4,767,084, entitled "Autonomous Stationkeeping for Three-Axis Stabilized Spacecraft," discloses the concept of dumping pitch momentum during an east-west stationkeeping maneuver using bi-propellant thrusters. The control systems in accordance with the present invention includes a similar approach using gimbaled ion thrusters for dumping three-axis momentum during north-south maneuvers. However, momentum dumping, in and of itself, is not considered to be novel.

Chan U.S. Pat. No. 4,537,375, entitled "Method and Apparatus for Thruster Transient Control," discloses the concept of storing estimated values of disturbance torques during a bi-propellant stationkeeping maneuver and reusing the disturbance torque estimates for initialization at the start of the next maneuver. A similar initialization technique is used in accordance with the present invention.

The following references disclose the concept of disturbance torque estimation on momentum biased satellites:

Rahn, C. D., "Asymptotic Disturbance Rejection for Momentum Bias Spacecraft", *AIAA Journal of Guidance, Control and Dynamics*, September–October 1992;

Beach, S. W., "Autonomous Compensation for Orbital Disturbances of Known Frequency", AAS-026, AAS Guidance and Control Conference 1983, Volume 51;

Passerson, L., Bozzo, C. "Overcoming Unobservability in Three-Axis Stabilization of Satellites", Presented at the *Guidance and Control Panel* $37^{th}$ *Symposium*, Florence, Italy, Sep. 27–30, 1983;

Lebsock, K. L. "Magnetic Desaturation of a Momentum Bias System", *AIAA Journal of Guidance & Control*, Vol. 6, No. 6, November–December 1983; and Broquet, J., "Selection and Adaptation of a Control Law for a Double Gimbaled Momentum Wheel System on a Large Solar Array Satellite", Proceedings of the IFAC $6^{th}$ World Congress, Boston Mass. Aug. 24–30, 1975. Such disturbance torque estimation is one of several features used in the present invention. In the above-mentioned references that disclose disturbance torque estimation, emphasis is generally placed on estimating roll/yaw torques for the purpose of improving yaw pointing performance during normal mode operations. In contrast, the control system forming part of the present invention places emphasis on estimating pitch disturbances, as accurate estimation of pitch disturbances is critical to achieving yaw pointing performance during operation of the ion propulsion system.

SUMMARY OF THE INVENTION

The present invention provides a method and a control system for accurate three-axis pointing control of a momentum biased spacecraft. The present invention uses two-axis measurement based control while the spacecraft is subjected to disturbance torques arising from the firing of a low thrust electric engine (such as a Xenon Ion Propulsion System (XIPS) thruster). The present invention assumes the existence of a two-axis attitude sensor, such as an earth sensor, to measure roll and pitch, but the present invention does not require the presence of a sensor for the third axis, yaw. Furthermore, the present invention does not require the use of gyros to sense yaw. Additionally, the XIPS thrusters may be used to produce a non-zero torque for the purpose of dumping momentum from the primary attitude control system actuator (i.e., a momentum wheel). In a such a system, accurate roll and pitch pointing is relatively easy, as it employs direct feedback of roll and pitch measurements. However, accurate yaw pointing is very difficult because there is no direct measurement of yaw attitude available to the attitude control system.

The present invention achieves accurate yaw pointing by taking advantage of known roll/yaw coupling and pitch/yaw coupling effects to estimate and correct yaw motion even though there is no yaw sensor. Roll/yaw coupling arises from the spacecraft nutation dynamics and from the once-per-orbit rotational motion of the spacecraft (orbital coupling). As will be explained below, pitch/yaw coupling occurs as a result of the geometry of the ion thruster, which is the major source of the disturbance torque.

The attitude control system in accordance with the present invention employs a feedback controller that works in two distinct phases, a transient phase and a steady-state phase. The same computational feedback control algorithms are used in both phases, but controller gains within the algorithm are adjusted to minimize yaw motion during both phases.

In Phase 1, turn-on transients (such as those arising from initial thrust vector aim point errors and sloshing of bi-propellant liquid fuel on board the spacecraft) are dealt with. Phase 1 begins when the ion thrusters are turned on, and this phase lasts long enough for the initial transients to settle. Typically, Phase 1 lasts for fifteen to thirty minutes. In Phase 1, the following steps are taken to minimize attitude pointing errors, particularly yaw perturbations:

1. The initial value of the roll and pitch disturbance torque estimates are set to the values determined after settling of turn-on transients of the previous maneuver using the same ion thrusters (on the first maneuver these values are initialized to zero);
2. Feedback gains for attitude estimation are adjusted to avoid perturbations of the yaw estimate due to the turn-on transients. The yaw estimate is propagated open loop but is not substantially updated using the roll measurements;
3. A yaw feed forward torque is computed based on the known pitch/yaw geometry of the ion engine and the sensed pitch disturbances. This yaw feed forward torque is negated and fed into the attitude control system control actuator (i.e., the momentum wheel), causing it to oppose the yaw torque arising from the thruster turn-on transient;
4. The ion engine gimbals are steered to null the estimated disturbance torque (or to create a desired torque to dump momentum, if desired);
5. If the momentum dump torque is non-zero, opposing torques are fed forward to the main attitude control system actuator (i.e., the momentum wheel) thereby effecting the desired momentum dump; and
6. At the end of Phase 1 or early in Phase 2, the pitch and roll disturbance torque estimates are stored in memory for use the next time the same combination of ion thrusters are fired.

Phase 2, steady-state operation, commences at the end of Phase 1 and continues throughout the remainder of the stationkeeping maneuver. Typical stationkeeping maneuver durations may range from three to seven hours. During Phase 2, the following steps are taken to minimize attitude pointing errors, particularly yaw perturbations:

1. Feedback gains in the attitude estimator are adjusted to capitalize on the roll/yaw coupling, in order to estimate yaw attitude. This roll/yaw coupling is weak and the estimation process is necessarily slow to avoid excessive noise from the attitude sensor;
2. Feedback gains are also adjusted to ensure that the estimates of roll and pitch disturbance torques continue to track the time-varying disturbances from the ion engine;
3. The ion engine gimbals are steered to null the disturbance torque (or to create a desired torque to dump momentum if desired);
4. If the momentum dump torque is non-zero, opposing torques are fed forward to the main attitude control system actuator (i.e., the momentum wheel) thereby effecting the desired momentum dump.

Further pointing improvement is achieved in both the first and second phases by providing accurate estimates of environmental disturbance torques (e.g., torques due to solar forces, magnetic field interactions or payload emissions). These estimates of environmental disturbance torques are provided by estimating parameters of a Fourier series representation of the disturbances when the ion thrusters are not operating, and then propagating these Fourier series terms through the period when the thrusters are operating. Proper convergence of these estimates is crucial to attitude pointing performance during the stationkeeping maneuver, especially when performing momentum dumping.

In accordance with one aspect of the present invention, a method is provided for controlling the attitude of a momentum biased spacecraft about three mutually orthogonal axes during a thruster firing maneuver. (The spacecraft includes a pitch axis, a roll axis, and a yaw axis.) The method does not require separately sensing angular displacement, angular rate, or angular acceleration about one of the three mutually orthogonal axes. The method comprises the steps of: estimating torques applied by each thruster fired during the maneuver, including torques applied by the thrusters that result from thruster aiming errors or unknown center of mass motion; predicting environmental disturbance torques in pitch as well as roll/yaw; estimating spacecraft attitude and rotational rate about the unmeasured axis; and employing feedback to correct pointing error caused by thruster torques and environmental disturbance torques.

The step of estimating torques applied by each thruster fired during the maneuver may include a step of initializing estimated values for disturbance torques about the roll and pitch axes by setting the disturbance torques about the roll and pitch axes equal to corresponding values determined at a steady state phase of a prior maneuver.

The step of employing feedback to correct pointing error caused by thruster torques and environmental disturbance torques may include a step of opposing the estimated roll and pitch torques by gimbaling a thruster to produce an opposite torque.

The step of estimating torques applied by each thruster fired during the maneuver may include a step of utilizing a mathematical model for parameters defining motion of a center of mass of the spacecraft.

The method preferably further includes a step of storing values of estimated roll and pitch torques for the purpose of initializing the estimated roll and pitch torques for a subsequent maneuver.

The step of estimating torques applied by each thruster fired during the maneuver may include a step of calculating a yaw transient torque due to each thruster fired during the maneuver, based on coupling of the torque applied by the thruster about the pitch axis of the spacecraft and the torque applied by the thruster about the yaw axis of the spacecraft, and a step of opposing the yaw transient torque, for example, using an attitude control actuator and/or a gimbaled thruster.

The step of predicting environmental disturbance torques in pitch as well as roll/yaw may use measurements taken during periods of thruster inactivity to estimate environmental disturbances in pitch as well as roll/yaw, for example, by using mathematical models of disturbance torques to propagate estimated torques throughout the period of thruster operation, and/or mathematical models of spacecraft appendage motion to predict self-induced disturbance torques for one or more spacecraft appendages.

The method preferably includes a step of opposing the environmental torque, for example, by using an attitude control actuator and/or a gimbaled thruster.

The step of estimating spacecraft attitude and rotational rate about the unmeasured axis may include a step of adjusting estimator gains during a transient portion of the maneuver to minimize perturbation to a pre-existing estimate of yaw attitude.

The step of estimating spacecraft attitude and rotational rate about the unmeasured axis may include a step of utilizing a pre-existing estimate of yaw attitude and yaw rate, a mathematical model of spacecraft dynamics, the estimated thruster torques, and the estimated environmental disturbance torques to predict yaw attitude and yaw rate throughout a transient phase of the maneuver.

The step of estimating spacecraft attitude and rotational rate about the unmeasured axis may include a step of utilizing roll/yaw kinematic coupling to estimate yaw attitude and yaw rate from roll measurements.

The step of estimating spacecraft attitude and rotational rate about the unmeasured axis may include a step of utilizing roll/yaw kinematic coupling to estimate yaw attitude and yaw rate from roll measurements during a steady state phase of the maneuver.

The method may further include a step of intentionally off pointing of at least one thruster to accomplish a momentum dump, for example, by monitoring momentum contained in an attitude control actuator and computing a torque profile, about at least two axes, for the duration of the thruster firing required for the momentum dump, and/or by generating a required torque profile by appropriate gimbaling of the thruster.

The step of intentionally off pointing of at least one thruster to accomplish a momentum dump may include a step of providing a feedforward signal of an opposing torque to the attitude control actuator to effect the momentum dump.

In accordance with another aspect of the present invention, a method is provided for controlling the attitude of a momentum biased spacecraft about a pitch axis, a roll axis, and a yaw axis during a thruster firing maneuver without separately sensing angular displacement, angular rate, or angular acceleration about the yaw axis. The method comprises the steps of: initializing estimated values for disturbance torques about the roll axis and the pitch axis of the spacecraft by setting the disturbance torques about the roll axis and the pitch axis of the spacecraft equal to corresponding values determined at a steady state phase of a prior maneuver; calculating a yaw feedforward transient torque based on coupling of the disturbance torque about the pitch axis of the spacecraft and a disturbance torque about the yaw axis of the spacecraft for each thruster that is fired during the maneuver; opposing the disturbance torque about the yaw axis by sending a feedforward signal representative of the yaw feedforward transient torque to an attitude control actuator; steering each thruster that is fired during the maneuver during firing of the thruster to null the estimated disturbance torques; and storing the estimated pitch disturbance torque and the estimated roll disturbance torque. Preferably, the method further includes the steps of: adjusting feedback gains after a steady state phase of the maneuver is achieved, to estimate yaw attitude based on coupling of a steady state disturbance torque about the roll axis of the spacecraft and a steady state disturbance torque about the yaw axis of the spacecraft; and steering each thruster that is fired during the maneuver during firing of the thruster to null the estimated steady state disturbance torques.

In accordance with yet another aspect of the present invention, a method is provided for controlling the attitude of a momentum biased spacecraft about a pitch axis, a roll axis, and a yaw axis during a thruster firing maneuver without separately sensing angular displacement, angular rate, or angular acceleration about the yaw axis. The method comprising the steps of: initializing estimated values for disturbance torques about the roll axis and the pitch axis of the spacecraft by setting the disturbance torques about the roll axis and the pitch axis of the spacecraft equal to corresponding values determined at a steady state phase of a prior maneuver; calculating a yaw feedforward transient torque based on coupling of the disturbance torque about the pitch axis of the spacecraft and a disturbance torque about the yaw axis of the spacecraft for each thruster that is fired during the maneuver; opposing the disturbance torque about the yaw axis by sending a feedforward signal representative of the yaw feedforward transient torque to an attitude control actuator; steering each thruster that is fired during the maneuver during firing of the thruster to create a desired torque to dump momentum; and storing the estimated pitch disturbance torque and the estimated roll disturbance torque. Preferably, the method further includes the steps of: adjusting feedback gains after a steady state phase of the maneuver is achieved, to estimate yaw attitude based on coupling of a steady state disturbance torque about the roll axis of the spacecraft and a steady state disturbance torque about the yaw axis of the spacecraft; and steering each thruster that is fired during the maneuver during firing of the thruster to create a desired torque to dump momentum.

The present invention provides the capability to utilize ion propulsion on a momentum biased satellite, without the addition or requalification of any new sensors for the purpose of sensing yaw disturbances induced by the ion propulsion system.

The invention itself, together with further objects and attendant advantages, will be best understood by reference to the following detailed description, taken in conjunction with the accompanying drawings.

DESCRIPTION OF THE PREFERRED EMBODIMENT

Figure 1:
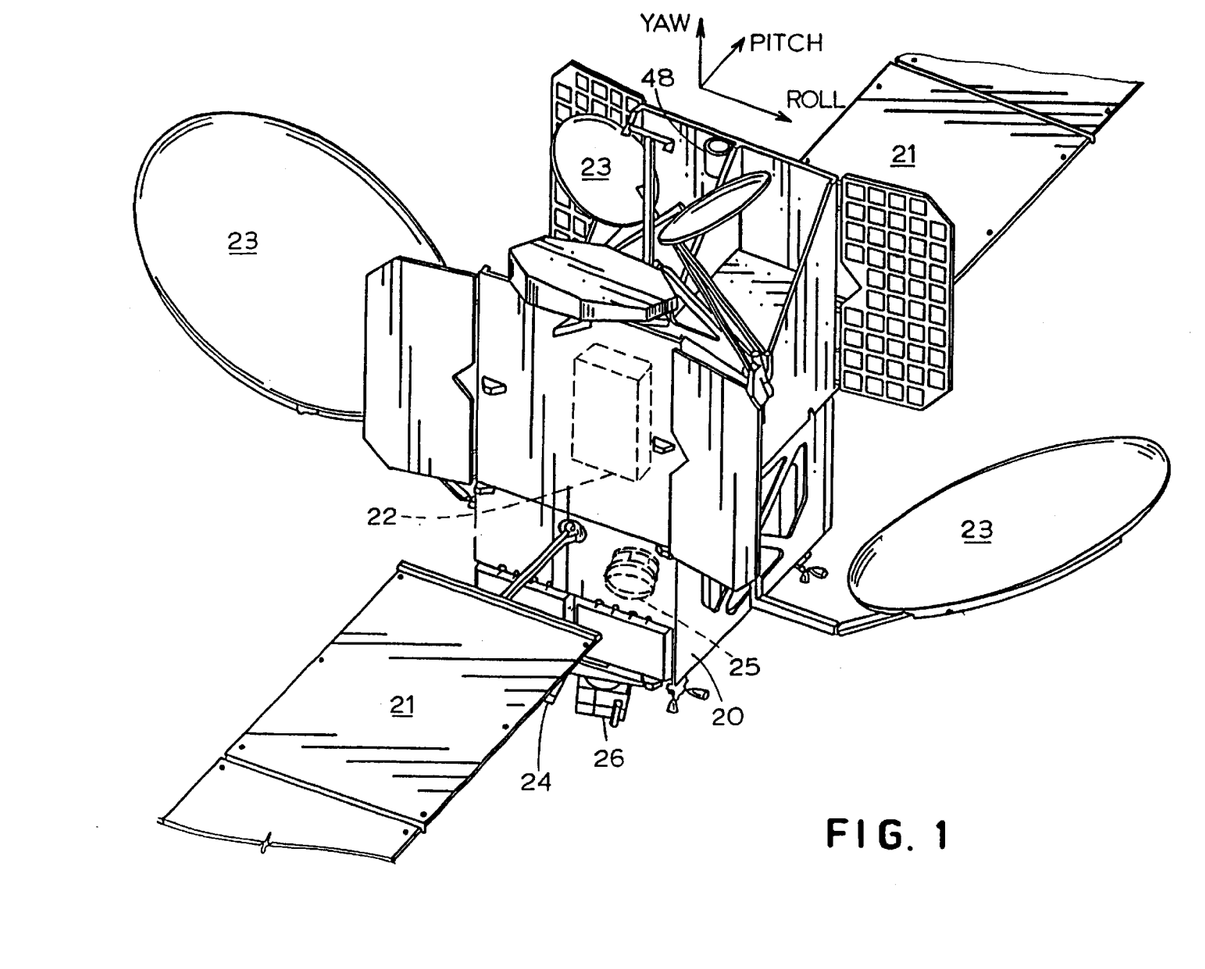
FIG. 1 is a schematic representation of a momentum biased satellite in which a control system in accordance with the present invention may be implemented.
Figures 2, 3:
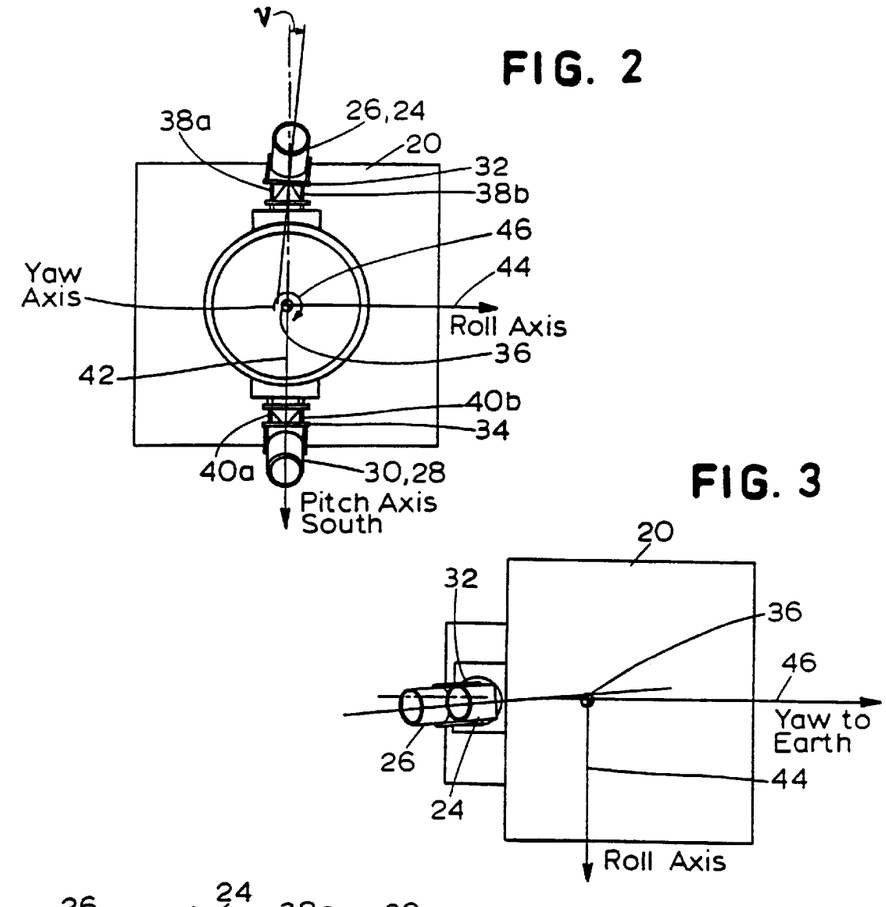
FIG. 2 is a schematic view of a portion of the spacecraft of FIG. 1, taken from the anti-nadir side of the spacecraft, illustrating the orientation of xenon ion propulsion engines and associated gimbaling systems on the spacecraft.
FIG. 3 is a schematic view of the portion of the spacecraft shown in FIG. 2, from the north side of the spacecraft, illustrating the orientation of the xenon ion propulsion engines and the associated gimbaling systems.
Figure 4:
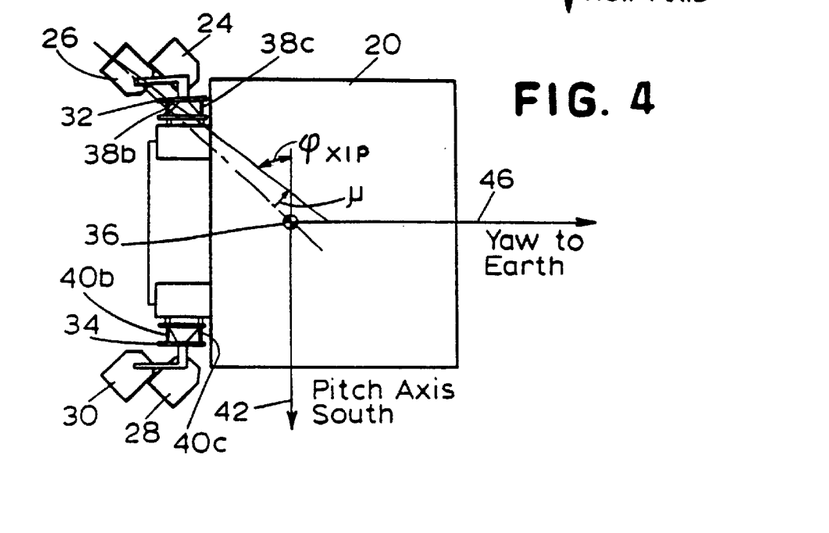
FIG. 4 is a schematic view of the portion of the spacecraft shown in FIG. 2, taken from the east side of the spacecraft, illustrating the orientation of the xenon ion propulsion engines and the associated gimbaling systems.

As shown in FIG. 1, a spacecraft 20 includes solar wings 21, an on-board computer depicted schematically at 22, an earth sensor 48, a two axis gimbaled pitch momentum wheel assembly 25, antennae 23, and four xenon ion propulsion (XIP) engines 24, 26, 28, and 30 shown in FIGS. 2–4. As best seen in FIG. 4, the XIPS engines 24, 26, 28, and 30 are mounted to the anti-nadir face of the spacecraft (i.e., the side of the spacecraft facing away from the earth). Thrusters 24 and 26 are mounted to the north edge of the anti-nadir face of the spacecraft, and thrusters 28 and 30 are mounted to the south edge of the anti-nadir face of the spacecraft The north pair of thrusters 24 and 26 comprise a primary thruster (thruster 24) and a redundant thruster (thruster 26) both mounted to a north two-axis gimbaled platform 32. Similarly, the south pair of thrusters 28 and 30 comprises a primary thruster (thruster 28) and a redundant thruster (thruster 30) both mounted to a south two-axis gimbaled platform 34. The thrusters 24, 26, 28, and 30 are aligned to provide as large a north/south thrust component as feasible, given that the thrusters 24, 26, 28, and 30 must also point nearly through the spacecraft center of mass 36 while avoiding plume impingement on the solar wings 21. As will be appreciated by those skilled in the art, other configurations are possible, including thrusters at the corners of the north/south face, as disclosed in the Tilley et al. '532 patent, or thrusters mounted along the east and west faces of the spacecraft 20, as disclosed in the Krulle et al. article. A fixed or V-wheel arrangement of momentum wheels is also feasible.

With reference to FIGS. 2–4, gimbaling of each two-axis gimbaled platform 32 and 34 is achieved by the use of a set of three jack screws, 38a, 38b, and 38c for the north two-axis gimbaled platform 32 and three jack screws 40a, 40b, and 40c for the south two-axis gimbaled platform 34. The jack screws 38a, 38b, 38c, 40a, 40b, and 40c provide translational motion parallel to the spacecraft pitch axis 42. Relative displacements of the jack screws 38a, 38b, 38c, 40a, 40b, and 40c is equivalent to gimbal motion about the spacecraft roll axis 44 and the spacecraft yaw axis 46, as illustrated in FIGS. 2–4. When the two-axis gimbaled platforms 32 and 34 are level, the north platform has a normal vector that aligns with the negative pitch axis 42, and the south platform has a normal vector aligned with the positive pitch axis 42. The thrusters 24, 26, 28, and 30 are mounted to the platforms 32 and 34 with mechanical cant angles, such that the thrust vectors of each of the thrusters 24, 26, 28, and 30 are pointed nearly through the spacecraft center of mass 36 when the platforms 32 and 34 are level. Thus, the thrust vector of each thruster 24, 26, 28, and 30 can be gimbaled to point in a neighborhood of directions about the spacecraft center of mass 36 by tilting the appropriate two-axis gimbaled platform 32 or 34. Other thrust vector gimbaling arrangements are also possible.

The thrusters 24, 26, 28, and 30 each produce a constant thrust, and in the configuration shown herein, only one of the thrusters 24, 26, 28, or 30 is fired at any given time.

The torques created by gimbaling either of the platforms 32 or 34 are as follows. Starting with the thrust vector aligned through the center of mass 36, when a platform 32 or 24 is gimbaled in roll, roll torque is produced. However, again starting with the thrust vector aligned through the spacecraft center of mass 36, when a platform 32 or 34 is gimbaled in yaw, pitch and yaw torques are simultaneously produced. It is, in part, this coupling of yaw torque to pitch torque that allows the spacecraft 20 to be controlled accurately without the need for a yaw sensor.

The main purpose of the XIPS thrusters 24, 26, 28, and 30 is to perform north/south stationkeeping. North/south stationkeeping is achieved by alternatively firing one of the north pair of thrusters 24 or 26 and one of the south pair of thrusters 28 or 30 at opposing orbital nodes. In this mode, the thrust vector is pointed through the spacecraft center of mass 36 as each thruster 24, 26, 28, or 30 is fired for a predetermined amount of time. The radial components of thrust from the north thruster 24 or 26 and the south thruster 28 or 30 fired at opposing nodes can be made to cancel one another (or can be utilized to augment eccentricity control). Roll/yaw momentum can be managed simultaneously with north/south stationkeeping by intentionally aiming the thrust vector off of the spacecraft center of mass 36 to produce a time-varying roll torque profile.

Figure 5:
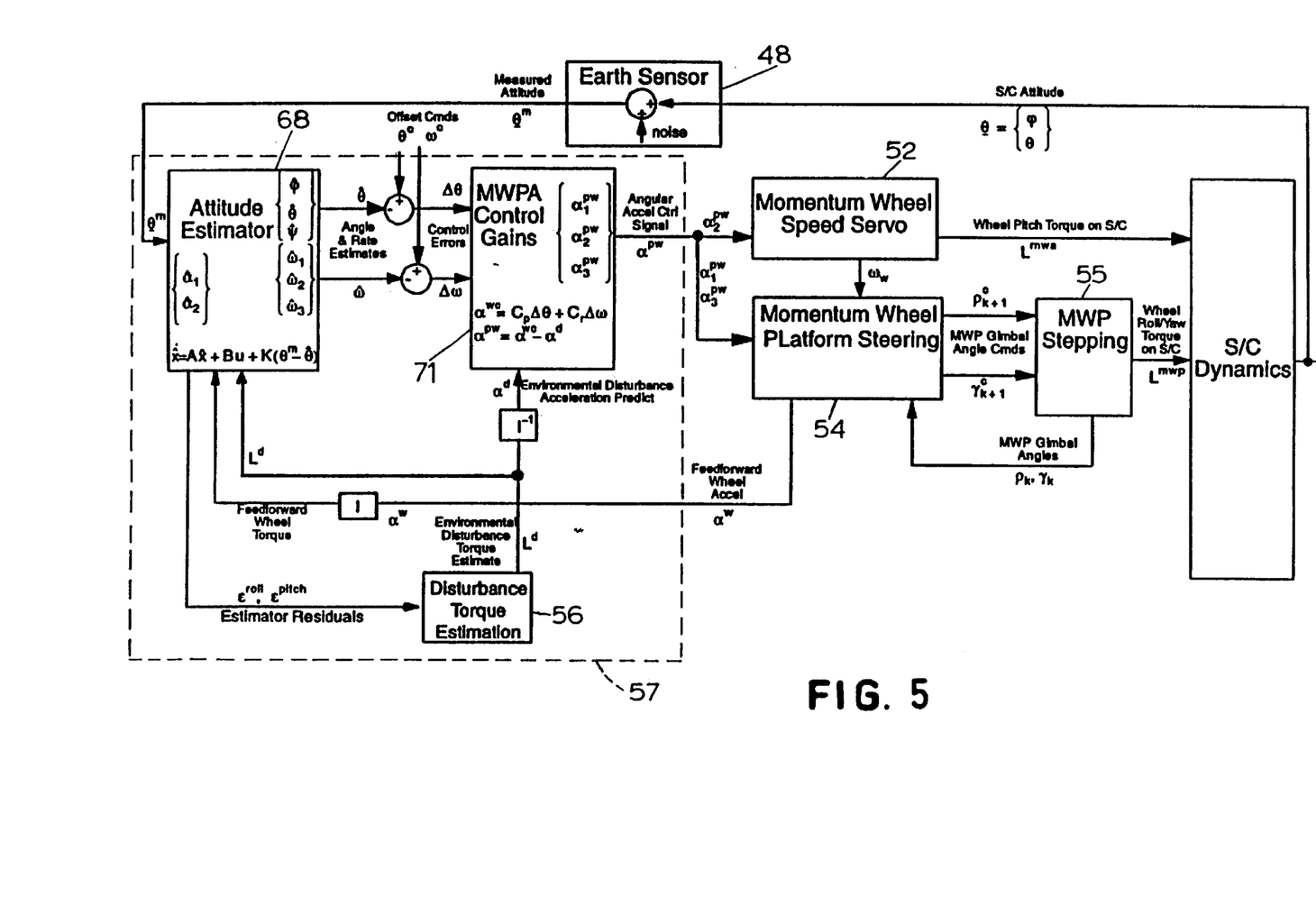
FIG. 5 is a block diagram depicting the attitude control loop used when the xenon ion propulsion engines are not operative.

With reference to FIG. 5, a closed loop attitude control system is shown for use during a normal mode when none of the XIPS thrusters 24, 26, 28, or 30 is firing. Spacecraft attitude is sensed by an earth sensor 48 (or alternatively by an equivalent sensor such as a beacon sensor) and processed in the onboard flight computer 22 (shown schematically in FIG. 1), which sends commands to drive attitude control system actuators, such as for example, a momentum wheel speed servo 52, momentum wheel platform steering logic 54, and momentum wheel platform stepping block 55. With the exception of a disturbance torque estimation block 56, described in further detail below, the control algorithms 57 used for the normal mode are essentially identical to those that might be used on a mission that does not include XIPS thrusters.

Figure 6:
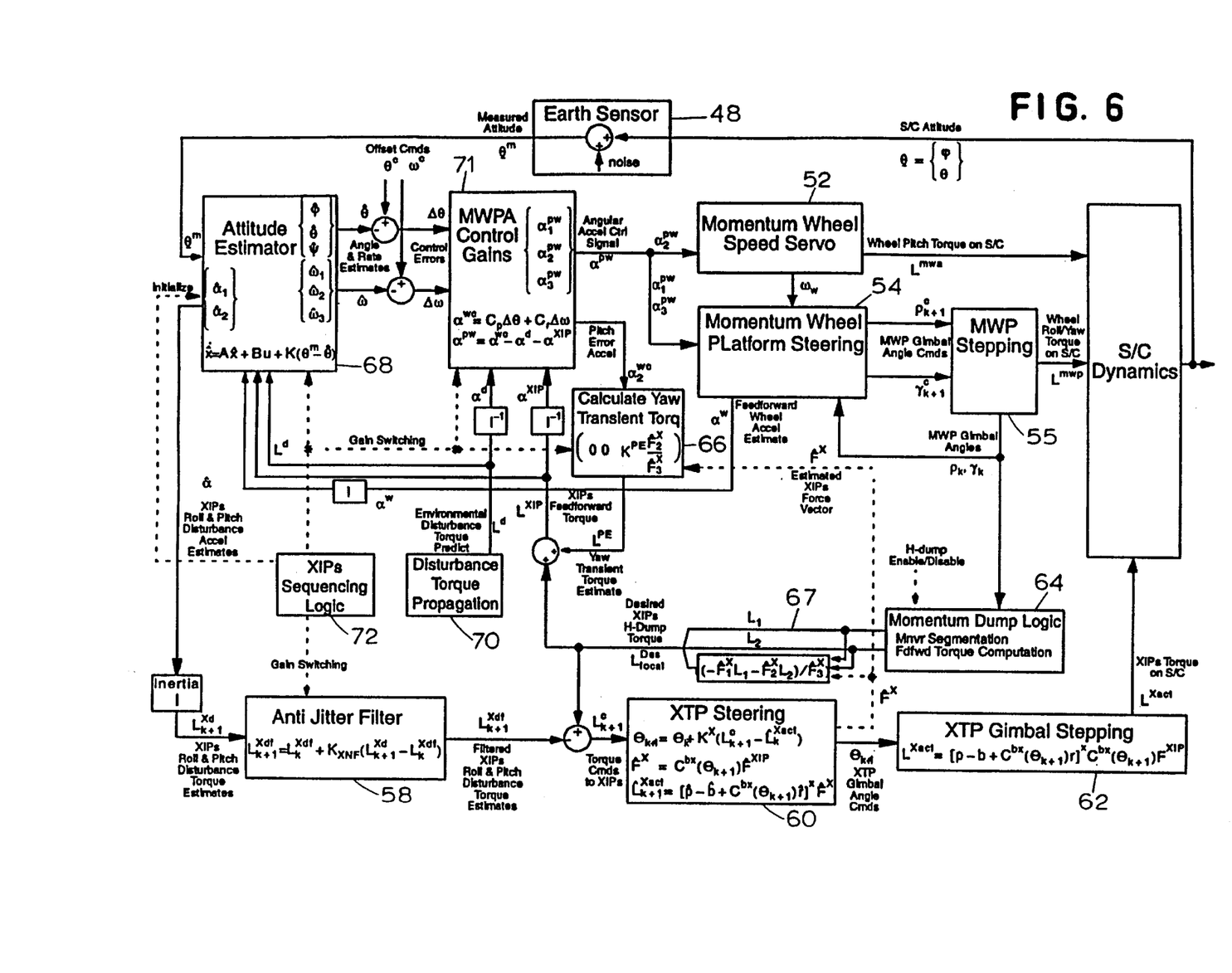
FIG. 6 is a block diagram depicting the attitude control loop used when the xenon ion propulsion system is operating.

FIG. 6 illustrates the attitude control system used when one of the XIPS thrusters 24, 26, 28, or 30 is firing. As compared to FIG. 5, the added hardware for the attitude control system of FIG. 6 is the XIPS thrusters 24, 26, 28, and 30 and the two-axis gimbaled platforms 32 and 34. The added control algorithms for the attitude control system of FIG. 6 include a loop to position the two-axis gimbaled platform 32 or 34, that includes an anti-jitter filter 58, a XIPS Thruster Platform (XTP) steering block 60, a XTP gimbal stepping block 62, a loop to dump momentum, if desired, that includes momentum dump logic blocks 64 and 67, and a feedforward torque compensation for yaw transient torque that is calculated in block 66.

The derivation of the feedforward torque compensation for yaw transient torque is as follows:

Due to closed loop pitch control, we know that, at the end of the initial transient, the pitch rate will be nulled.

$$\Delta\omega_2 = 0 = \frac{1}{I_2}\int L_2(t)dt = \frac{1}{I_2}\int \{L_2^{XTP}(t) + L_2^{MWA}\}dt$$

However, the yaw rate at the end of the transient is given by:

$$\Delta\omega_3 = \frac{1}{I_3}\int L_3^{XTP}(t)dt = \frac{1}{I_3}\int \{-\cot(\varphi_{xip})L_2^{XTP}(t)\}dt$$

Solving the first equation for $\int L_2^{XTP}(t)dt$:

$$\int L_2^{XTP}(t)dt = I_2\Delta\omega_2 - \int L_2^{MWA}dt$$

And Substituting into $2^{nd}$ equation:

$$\Delta\omega_3 = -\cot(\varphi_{XIP})\frac{1}{I_3}\int L_2^{XTP}(t)dt = -\frac{\cot(\varphi_{XIP})}{I_3}\left[I_2\Delta\omega_2 - \int L_2^{MWA}dt\right]$$

We know that, at the end of the transient, the closed loop action of the pitch controller will force $\Delta\omega_2 \to 0$. So at the end of the transient, $$\Delta\omega_3 = \frac{\cot(\varphi_{xip})}{I_3}\int L_2^{MWA}dt = \frac{1}{I_3}\int L^{PE}(t)dt$$

We conclude that if we apply an MWP feedforward yaw torque having an integral over the transient period equal to $\Delta\omega_3$, then we could cancel this induced rate.

Where:

$\Delta\omega_2$, $\Delta\omega_3$ are change in pitch and yaw components, respectively, of body rate during the transient period;

$I_2$, $I_3$ are the inertia of the spacecraft about pitch and yaw axes, respectively;

$L_2(t)$ is the time-dependent external pitch torque on spacecraft during transient period;

$L_2^{XTP}(t)$, $L_3^{XTP}(t)$ are the time dependent pitch and yaw torque, respectively, due to ion thruster during the transient period;

$L_2^{MWA}(t)$ is the time dependent pitch torque of the momentum wheel actuator during the transient period;

$\phi_{XIP}$ is the angle between pitch axis and ion engine thrust vector (see FIG. 4); and $L^{PE}(t) = \cot(\phi_{XIP}) L_2^{MWA}(t)$.

To steer the two-axis gimbaled platforms 32 and 34, the onboard flight computer 22 has a prediction of the location of the spacecraft center of mass 36 as well as geometry parameters for each of the XIPS thrusters 24, 26, 28, and 30. This information is used in the XTP steering block 60 to initially point the thrust vector, via platform gimbaling, relative to the spacecraft center of mass 36, in order to produce the desired torque during the stationkeeping maneuver. Since this prediction is only approximate, an unintentional XIPs-induced torque will be produced on the spacecraft 20. The roll and pitch components of the XIPs-induced disturbance torques are estimated in an attitude estimation block 68 by processing the attitude measurement residual obtained from the earth sensor 48. The estimated XIPs-induced roll and pitch disturbance torques are filtered to remove high frequency noise via the anti-jitter filter 58, and then input to the XTP steering block 60 where they are used to move the two-axis gimbaled platform 32 or 34 to null the disturbances. Note that a yaw torque input into the XTP steering block 60 is not required. Each two-axis gimbaled platform 32 and 34 has only two degrees of freedom and its null position is uniquely controlled by the roll and pitch torque estimates. Because of the pitch/yaw geometry of each of the two-axis gimbaled platforms 32 and 34, nulling the pitch torque will simultaneously null the yaw torque. Thus, the present invention capitalizes on the mounting geometry of each thruster 24, 26, 28, and 30 to correct the yaw component of XIPs-induced torque disturbances without requiring a physical yaw sensor.

In order for the control scheme in accordance with the present invention to be effective, it is important that the estimate of pitch torque contain only the XIPs-induced disturbance torques and not other environmental disturbances. This is the case because if the XIPS thrusters 24, 26, 28, and 30 were off-pointed in pitch to correct for environmental pitch disturbances, then corresponding yaw torques would be introduced, thereby degrading yaw pointing performance. Consequently, all environmental torques (excluding XIPs torques) acting on the spacecraft 20 must be estimated and corrected elsewhere. This function is achieved in the disturbance torque estimation block 56 of FIG. 5, and a disturbance torque propagation block 70 in FIG. 6.

The environmental torques are analytically modeled using finite-term Fourier series. These series are replicated in the flight computer 22 with a constant term (body-fixed) and harmonic terms with frequencies at multiples of orbit rate. The yaw body fixed torque component is unobservable and only roll and pitch components can be estimated from the earth sensor 48 measurements. However, harmonic components for all three axes can be estimated. These estimates are propagated (using a Fourier series model) and updated (using roll and pitch measurements) during normal mode operation, as shown in FIG. 5, but are only propagated, and not updated, during XLPs maneuvers, as shown in FIG. 6. These disturbance torque estimates are fed forward to the attitude estimator 68 and to a Momentum Wheel Platform Assembly (MWPA) control gains block 71 during XIPs firing. The attitude estimator 68 will then estimate roll and pitch body fixed disturbance torques over and above environmental torques—i.e., it will estimate the XIPs-induced disturbance torques.

A further modeling improvement is to include a model of the daily motion of the spacecraft center mass 36 and develop an on-board estimator to force convergence of this model. This option is not included in the preferred implementation of the invention, since a given XIPS thruster 24, 26, 28, or 30 fires at approximately the same time from day to day.

Another further modeling improvement is to include models of disturbances caused by motion of one or more spacecraft appendages, such as a solar wing or antennae, and utilize appropriate feedforward torques to control system actuators to oppose the modeled disturbances.

With all the above precautions, the control scheme shown in FIG. 6 does an effective job of nulling the XIPs-induced 3-axis torque errors once the XfPs-induced disturbance estimates have converged. However, during the transient period preceding this convergence, the unbalanced XIPs-induced disturbance torques are perturbing the spacecraft's attitude and rotation rates. These perturbations are small and the roll and pitch components thereof are easily corrected via the closed attitude system control loop (using the earth sensor 48 and momentum wheel controllers 52 and 54). Even so, additional precautions must be taken to compensate the yaw errors arising from these transients. These additional precautions are described below.

As evident in FIG. 6, the preferred implementation of the present invention supports a capability to perform momentum dumping during the XIPs burn. Although momentum dumping is supported by the preferred implementation of the invention, it is not a new concept and is not, in isolation, to be considered a part of the present invention. A brief explanation of the momentum dumping capability is included for the sake of completeness. The momentum dump logic block 64 monitors momentum wheel speed and gimbal positions prior to starting a maneuver and determines the roll/yaw dump that is required. (It will be appreciated by those skilled in the art that a similar three-axis momentum dump could alternatively be implemented, if desired.) Roll torques can easily be achieved via roll offset of the appropriate two-axis gimbaled platform 32 or 34, but a yaw torque cannot be attained without an accompanying pitch torque. To effect a yaw dump, a XIPs maneuver is broken into two segments, each having two phases. The segmentation is only required to do roll/yaw momentum management simultaneously with the twice daily XIPs stationkeeping burns. During each of the two segments, a non-zero XIPs roll torque, $L_{local}^{Des}$, is commanded, and the polarity of the torque is switched between segments such that the inertially expressed roll/yaw components of momentum will be altered. Processing to perform segmentation and calculation of the roll torque command is performed by the momentum dump logic block 64 of FIG. 6. If momentum is not to be managed during a XIPs maneuver then the momentum dump logic block 64 is disabled and only one segment is executed with $L_{local}^{Des} = 0$.

As noted earlier, each segment of a XIPs burn is divided into a first phase (transient phase) and a second phase (steady state phase). A XIPs sequencing logic block 72 shown in FIG. 6, controls the sequencing between the two phases. The XIPs sequencing logic block 72 performs several gain switching functions as well as timing functions.

Phase 1 (transient phase) of each segment is required to quickly null thruster turn-on or torque polarity switch transients. The roll and pitch loops are designed with high bandwidths. The goal is to quickly null roll and pitch components of XIPs disturbance torques using roll and pitch measurements. Since a yaw measurement is not available, yaw control must be handled differently. The yaw estimator relies primarily on model dynamics, i.e., roll/yaw kinematic coupling due to orbit-normal steering of a momentum bias spacecraft, roll/yaw dynamic coupling also due to momentum bias design and XIPs pitch/yaw torque coupling due to thrust tilt. The yaw attitude estimate is propagated in the attitude estimation block 68 based upon analytical models and calculated disturbance torques, but estimator gains are chosen so that is it not substantially updated via measurement from the earth sensor 48. This ensures that the yaw estimate is minimally perturbed during this first phase while roll and pitch transients are occurring. As such, yaw control is essentially open-loop. Nevertheless, yaw transient during this period is small by virtue of the fast response of the pitch loop in nulling the pitch and yaw components of XIPs disturbance torque, and by virtue of the following additional feature.

A special design feature is incorporated to compensate for the momentum dumped into the yaw axis during the transient phase while the XIPs disturbance pitch torque is non-zero. The derivation of the yaw transient torque compensation torque as presented above will now be explained in more detail. Before the XIPs-induced pitch disturbance is zeroed, the momentum wheel must provide a torque, $L_2(t)$, to maintain spacecraft pitch attitude, including torque required to cancel disturbance torque estimates from the normal mode controller of FIG. 5. If the pitch bandwidth is high, the spacecraft pitch attitude will be held very tightly ($\Delta\omega_2 \cong 0$). Therefore, the torque provided by the momentum wheel assembly 25, $L_2^{MWA}(t)$, excluding that required to cancel the normal mode disturbance torque estimate, is essentially the opposite of the XIPs induced pitch torque $L_2^{XTP}(t)$. This component of momentum wheel torque can be used as a measurement of the XIPs-induced pitch torque. Since XIPs pitch and yaw torque are coupled, the XIPs-induced yaw torque can be accurately calculated from the pitch torque. This is the function of the calculate yaw transient torque block 66. This estimated yaw torque, $L^{PE}$, is fed forward to the attitude estimator 68 and MWPA control gains block 71 to counter the momentum dumped into the yaw axis during the transient phase.

A variation of the aforementioned scheme is to control the attitude of the spacecraft 20 by solely using the XIPs thrusters 24, 26, 28, and 30 during this first phase. In this variation, the momentum wheel only provides torque to cancel the normal mode disturbance torque estimates. Again due to pitch/yaw coupling, using one of the thrusters 24, 26, 28, or 30 to maintain pointing in pitch will necessarily maintain pointing in yaw. In other words, any momentum dumped into yaw by thruster off-pointing will be removed by the thruster as the pitch attitude is nulled. This variation works equally as well as the preferred implementation, but requires significantly more activity in the two axis gimbaled platforms 32 and 34.

The above combination of design features insures that the actual yaw attitude remains small and the yaw angle and rate estimation errors also remain small throughout the transient phase.

Phase 2 (steady state phase) is required in a burn segment since the yaw estimator during the first phase is nearly open loop and pointing errors will slowly increase if no change is made to the control loop configuration. Consequently, the estimator gains during the steady state phase are changed to estimate yaw attitude from the roll measurement utilizing the rollyaw dynamic and orbit coupling. While this improves the yaw estimate, it leads to lower bandwidth roll control, but this is not a problem since the XIPs-induced roll torques were compensated during the first phase. Only variations in the location of the spacecraft center of mass 36 due to solar wing movement (i.e., movement due to solar panel deformation and movement of solar panels to track the sun—at orbit rate) need to be tracked during the steady state phase.

During the steady state phase, the yaw transient torque calculation (block 66 in FIG. 6) using pitch/yaw XIPs torque coupling is discontinued since the XIPs-induced pitch disturbance torque was nulled during the transient phase.

After the transients (e.g., transients induced by initial airpoint errors, or sloshing of bi-propellant liquid fuel on board the spacecraft 20) have settled during a burn segment, the XfPs-induced torque (acceleration) estimates are stored in memory in the onboard flight computer 22 and used as initial values of the estimates during the next burn using the same thruster. This initiates the estimates on the next XLPs burn closer to their final values, which facilitates even faster settling on the next XIPs burn. Pointing performance is thereby improved on successive burns. Operationally, one may expect to see a gradual improvement over the first several burns. If momentum management is to be performed, then each burn segment will have its own disturbance torque estimate saved from the prior burn. However, the estimates from the first segment are used as initial values for estimates of the second segment.

The present invention has been described with reference to specific examples, which are intended to be illustrative only, and not to be limiting of the invention, as it will be apparent to those of ordinary skill in the art that changes, additions and/or deletions may be made to the disclosed embodiments without departing from the spirit and scope of the invention.

We claim:

1. A method of controlling the attitude of a momentum biased spacecraft about three mutually orthogonal axes during a thruster firing maneuver without separately sensing angular displacement, angular rate, or angular acceleration about one of the three mutually orthogonal axes, the spacecraft including a pitch axis, a roll axis, and a yaw axis, the method comprising the steps of:

estimating torques applied by each thruster fired during the maneuver, including torques applied by the thrusters that result from thruster aiming errors or unknown center of mass motion;

predicting environmental disturbance torques in pitch as well as roll/yaw;

estimating spacecraft attitude and rotational rate about the unmeasured axis; and employing feedback to correct pointing error caused by thruster torques and environmental disturbance torques.

2. The method of claim 1, wherein the step of estimating torques applied by each thruster fired during the maneuver comprises a step of initializing estimated values for disturbance torques about the roll and pitch axes by setting the disturbance torques about the roll and pitch axes equal to corresponding values determined at a steady state phase of a prior maneuver.

3. The method of claim 2, wherein the step of employing feedback to correct pointing error caused by thruster torques and environmental disturbance torques includes a step of opposing the estimated roll and pitch torques by gimbaling a thruster to produce an opposite torque.

4. The method of claim 1, wherein the step of estimating torques applied by each thruster fired during the maneuver comprises a step of utilizing a mathematical model for parameters defining motion of a center of mass of the spacecraft.

5. The method of claim 1, further including a step of storing values of estimated roll and pitch torques for the purpose of initializing the estimated roll and pitch torques for a subsequent maneuver.

6. The method of claim 1, wherein the step of estimating torques applied by each thruster fired during the maneuver includes a step of calculating a yaw transient torque due to each thruster fired during the maneuver, based on coupling of the torque applied by the thruster about the pitch axis of the spacecraft and the torque applied by the thruster about the yaw axis of the spacecraft.

7. The method of claim 6, further including a step of opposing the yaw transient torque.

8. The method of claim 6, further including a step of opposing the yaw transient torque using an attitude control actuator.

9. The method of claim 6, further including a step of opposing the yaw transient torque using a gimbaled thruster.

10. The method of claim 1, wherein the step of predicting environmental disturbance torques in pitch as well as roll/yaw uses measurements taken during periods of thruster inactivity to estimate environmental disturbances in pitch as well as roll/yaw.

11. The method of claim 1, wherein the step of predicting environmental disturbance torques in pitch as well as roll/yaw includes a step of using mathematical models of disturbance torques to propagate estimated torques throughout the period of thruster operation.

12. The method of claim 1, wherein the step of predicting environmental disturbance torques in pitch as well as roll/yaw includes a step of using mathematical models of spacecraft appendage motion to predict self-induced disturbance torques for one or more spacecraft appendages.

13. The method of claim 1, further including a step of opposing the environmental torque.

14. The method of claim 1, further including a step of opposing the environmental torque using an attitude control actuator.

15. The method of claim 1, further including a step of opposing the environmental torque using a gimbaled thruster.

16. The method of claim 1, wherein the step of estimating spacecraft attitude and rotational rate about the unmeasured axis includes a step of adjusting estimator gains during a transient portion of the maneuver to minimize perturbation to a pre-existing estimate of yaw attitude.

17. The method of claim 1, wherein the step of estimating spacecraft attitude and rotational rate about the unmeasured axis includes a step of utilizing a pre-existing estimate of yaw attitude and yaw rate, a mathematical model of spacecraft dynamics, the estimated thruster torques, and the estimated environmental disturbance torques to predict yaw attitude and yaw rate throughout a transient phase of the maneuver.

18. The method of claim 1, wherein the step of estimating spacecraft attitude and rotational rate about the unmeasured axis includes a step of utilizing roll/yaw kinematic coupling to estimate yaw attitude and yaw rate from roll measurements.

19. The method of claim 1, wherein the step of estimating spacecraft attitude and rotational rate about the unmeasured axis includes a step of utilizing roll/yaw kinematic coupling to estimate yaw attitude and yaw rate from roll measurements during a steady state phase of the maneuver.

20. The method of claim 1, further including a step of intentionally off pointing of at least one thruster to accomplish a momentum dump.

21. The method of claim 20, wherein the step of intentionally off pointing of at least one thruster to accomplish a momentum dump includes a step of monitoring momentum contained in an attitude control actuator and computing a torque profile, about at least two axes, for the duration of the thruster firing required for the momentum dump.

22. The method of claim 20, wherein the step of intentionally off pointing of at least one thruster to accomplish a momentum dump includes a step of generating a required torque profile by appropriate gimbaling of the thruster.

23. The method of claim 20, wherein the step of intentionally off pointing of at least one thruster to accomplish a momentum dump includes a step of providing a feedforward signal of an opposing torque to the attitude control actuator to effect the momentum dump.

24. A method of controlling the attitude of a momentum biased spacecraft about a pitch axis, a roll axis, and a yaw axis during a thruster firing maneuver without separately sensing angular displacement, angular rate, or angular acceleration about the yaw axis, the method comprising the steps of:

initializing estimated values for disturbance torques about the roll axis and the pitch axis of the spacecraft by setting the disturbance torques about the roll axis and the pitch axis of the spacecraft equal to corresponding values determined at a steady state phase of a prior maneuver;

calculating a yaw feedforward transient torque based on coupling of the disturbance torque about the pitch axis of the spacecraft and a disturbance torque about the yaw axis of the spacecraft for each thruster that is fired during the maneuver;

opposing the disturbance torque about the yaw axis by sending a feedforward signal representative of the yaw feedforward transient torque to an attitude control actuator;

steering each thruster that is fired during the maneuver during firing of the thruster to null the estimated disturbance torques; and storing the estimated pitch disturbance torque and the estimated roll disturbance torque.

25. The method of claim 24, further including the steps of:

adjusting feedback gains after a steady state phase of the maneuver is achieved, to estimate yaw attitude based on coupling of a steady state disturbance torque about the roll axis of the spacecraft and a steady state disturbance torque about the yaw axis of the spacecraft; and steering each thruster that is fired during the maneuver during firing of the thruster to null the estimated steady state disturbance torques.

26. A method of controlling the attitude of a momentum biased spacecraft about a pitch axis, a roll axis, and a yaw axis during a thruster firing maneuver without separately sensing angular displacement, angular rate, or angular acceleration about the yaw axis, the method comprising the steps of:

initializing estimated values for disturbance torques about the roll axis and the pitch axis of the spacecraft by setting the disturbance torques about the roll axis and the pitch axis of the spacecraft equal to corresponding values determined at a steady state phase of a prior maneuver;

calculating a yaw feedforward transient torque based on coupling of the disturbance torque about the pitch axis of the spacecraft and a disturbance torque about the yaw axis of the spacecraft for each thruster that is fired during the maneuver;

opposing the disturbance torque about the yaw axis by sending a feedforward signal representative of the yaw feedforward transient torque to an attitude control actuator;

steering each thruster that is fired during the maneuver during firing of the thruster to create a desired torque to dump momentum; and storing the estimated pitch disturbance torque and the estimated roll disturbance torque.

27. The method of claim 26, further including the steps of:

adjusting feedback gains after a steady state phase of the maneuver is achieved, to estimate yaw attitude based on coupling of a steady state disturbance torque about the roll axis of the spacecraft and a steady state disturbance torque about the yaw axis of the spacecraft; and steering each thruster that is fired during the maneuver during firing of the thruster to create a desired torque to dump momentum.

* * * * *